A. J. MATTER.
CAMERA SUPPORT.
APPLICATION FILED JUNE 3, 1918.

1,295,345.

Patented Feb. 25, 1919.

Inventor
Albert J. Matter

UNITED STATES PATENT OFFICE.

ALBERT J. MATTER, OF EAST ORANGE, NEW JERSEY.

CAMERA-SUPPORT.

1,295,345.     Specification of Letters Patent.     Patented Feb. 25, 1919.

Application filed June 3, 1918. Serial No. 238,000½.

*To all whom it may concern:*

Be it known that I, ALBERT J. MATTER, a citizen of the United States, residing at East Orange, in the county of Essex and State of New Jersey, have invented certain new and useful Improvements in Camera-Supports, of which the following is a specification.

This invention relates to improvements in camera supports and has for its object to provide means for attaching a support of this character to a tree or post.

Another object of my invention is to provide a camera support for the purpose mentioned, adapted to fold up so as to be easily carried in the pocket and provided with means for locking it in place upon a tree or other similar object.

Figure 1:
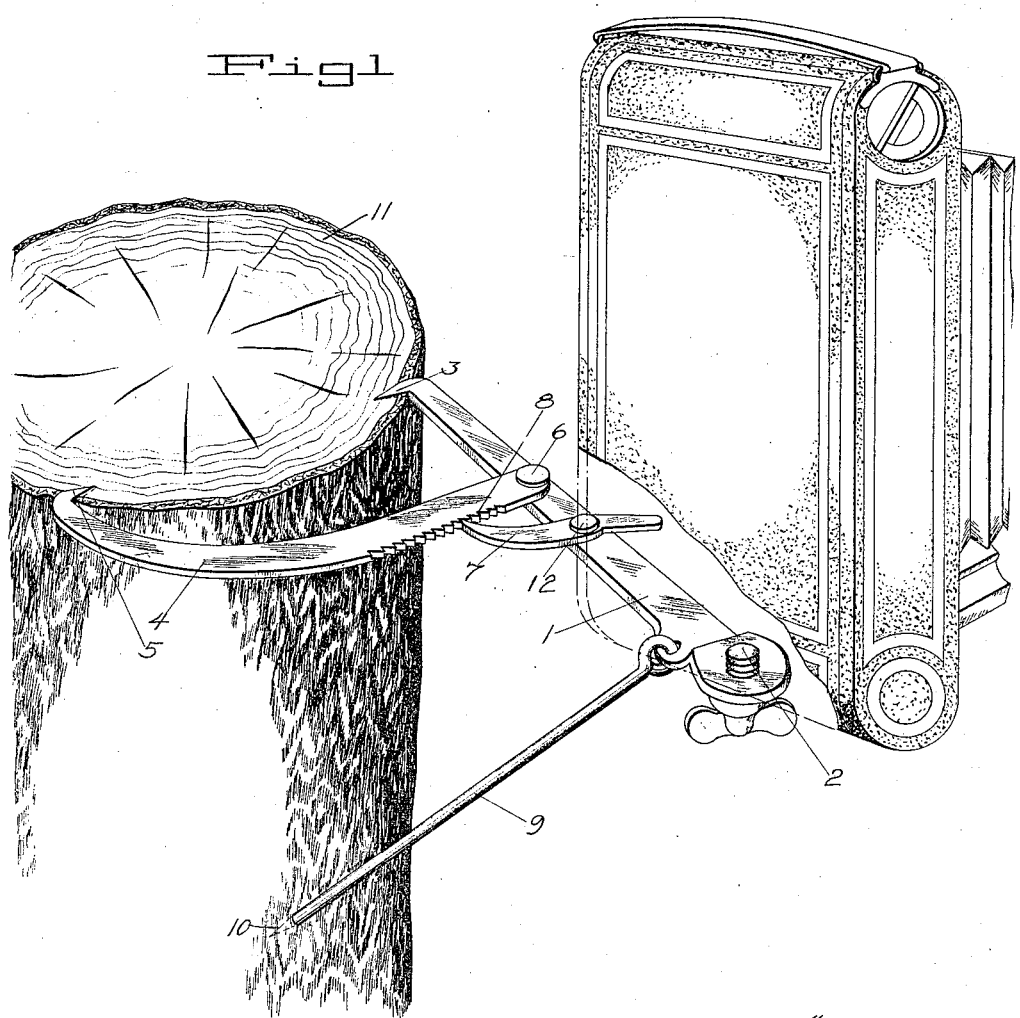

I attain these objects by means of the improvements illustrated in the accompanying drawings, in which, Figure 1 is a perspective view of the camera support, showing it attached to a tree, ready for use.

Figure 2:
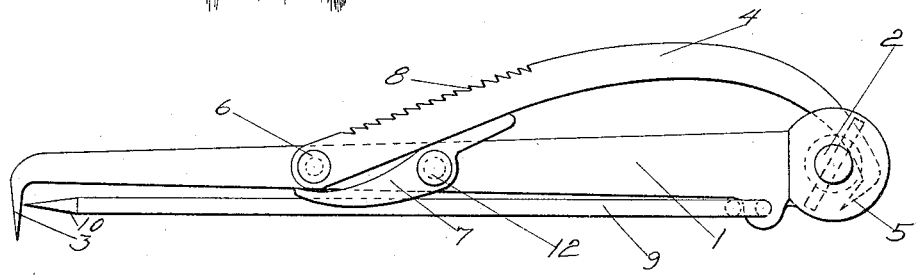

Fig. 2 shows the device folded.

Like numerals of reference in the drawings indicate similar parts througout the several views.

Referring to the drawings, 1 indicates the main camera supporting member which is provided at one end with a screw, 20 by means of which the camera is rigidly attached thereto.

The camera supporting member 1 is further provided with a hook or prong 3 at the end opposite the said screw 2.

An attaching member 4 having a hooked or pronged end 5 is pivotally attached to the supporting member 1 as by a riveted pin 6. A pawl 7 is pivotally attached to said supporting member by a pin 12, as shown in proper coöperative relation to the aforesaid attaching member which is provided with a toothed or serrated edge at 8 adapted to be engaged by said pawl.

A brace pin 9 is hingedly attached to the support 1, and is provided at its free extremity with a pointed end 10 as shown.

In the use, the prong 5 of the attaching member 4, is first placed against the tree 11, or other similar object and the supporting member 1 is then moved in the direction of the arrow until its prong 3 and the prong 5 of the attaching member are firmly engaged in the sides of the tree or other object. The pawl 7 is now placed in engagement with the teeth 8 so as to lock the support in place.

The brace pin 9 is now forced into the tree so as to hold the support in its proper position. By means of screw 20, the camera may now be attached to the support ready for use.

It is obvious that the leverage secured at the screw end of supporting member 1 will greatly facilitate attachment of the device and it will also be noted that the locking pawl 7 will prevent accidental displacement of the support after it is locked in place as shown in Fig. 1.

What is claimed is:—

1. In a camera support of the character described, a flat supporting member having a hook at one end and an offset head extending in a plane parallel therewith and provided with means for attaching a camera at the other end and an attaching member mounted upon said supporting member.

2. In a camera support having an attaching member provided with a pawl, another attaching member pivotally carried by said first mentioned attaching member and provided with ratchet teeth adapted to be engaged by said pawl for the purpose of locking said members in attached position.

3. In a camera support of the character described, pivotally joined attaching members having hooked ends disposed toward each other and provided with a camera attaching screw, one of the members being provided with a leverage procuring extension adapted to force the hooked ends of said members into attached position.

4. In a camera support of the character described, pivotally joined attaching members, one of which is provided with a leverage procuring extension and the other of which is provided with ratchet teeth and a locking pawl pivotally carried by the said extension and adapted to engage the aforesaid teeth for the purpose of locking the said attaching members in attached position.

5. In a camera support having an attaching member provided with a pawl, another attaching member pivotally carried by said first mentioned attaching member and provided with ratchet teeth between its pivotal point and its attaching end, adapted to be engaged by said pawl for the purpose of locking the members in attached position.

In testimony whereof I affix my signature in presence of two witnesses.

ALBERT J. MATTER. [L. S.]

Witnesses:
 JESSIE B. MATTER,
 MARGARET G. FARRELL.

Copies of this patent may be obtained for five cents each, by addressing the "Commissioner of Patents, Washington, D. C."